United States Patent Office.

JACOB BATES, OF SALINEVILLE, OHIO.

*Letters Patent No. 62,389, dated February 26, 1867.*

IMPROVED MEDICAL COMPOUND.

*The Schedule referred to in these Letters Patent and making part of the same.*

TO ALL WHOM IT MAY CONCERN:

Be it known that I, JACOB BATES, of Salineville, in the county of Columbiana, and State of Ohio, have invented a new and improved Medical Compound; and I do hereby declare that the following is a full, clear, and exact description of the same, which will enable others skilled in the art to make and use the same.

The present invention relates to a new and improved medical compound especially intended for the cure of coughs, colds, influenza, and other diseases of the lungs, which compound consists of the following ingredients mixed together in and about the proportions and in the manner hereinafter stated, viz: eight pounds elecampane; three pounds comfrey; three pounds spikenard; one pound of hoarhound; half pound lady's slipper; four pounds of sugar; one pound of honey; one ounce essence of winter-green. The elecampane, comfrey, spikenard, hoarhound, and lady's slipper, are first boiled or steeped until the strength is removed, when the honey, sugar, and essence of winter-green are added and the compound is ready for use. In lieu of the sugar and honey other substances may be used to sweeten the compound, and also the essence of winter-green may be dispensed with and other essences used to impart a flavor thereto.

I claim as new, and desire to secure by Letters Patent—

The medical compound composed of the ingredients herein described, for the purpose specified.

JACOB BATES.

Witnesses:
    H. C. ROBINS,
    RALPH THOMPSON, Jr.